United States Patent [19]
Graf et al.

[11] Patent Number: 5,422,556
[45] Date of Patent: Jun. 6, 1995

[54] PROCESS FOR REDUCING HYSTERESIS EFFECTS, AND AN ELECTROMECHANICAL TRANSDUCER IN WHICH HYSTERESIS EFFECTS ARE REDUCED IN THIS WAY

[75] Inventors: Friedrich Graf, Regensburg; Michael Ulm, Alteglofsheim; Klaus Stärker, Neutraubling, all of Germany

[73] Assignee: Siemens Aktiengesellschaft, Munich, Germany

[21] Appl. No.: 38,797

[22] Filed: Mar. 29, 1993

[30] Foreign Application Priority Data

Sep. 27, 1990 [EP] European Pat. Off. ............ 90118610

[51] Int. Cl.$^6$ ............................................. H02P 3/18
[52] U.S. Cl. ..................................... 318/701; 318/632
[58] Field of Search ............... 318/701, 632, 633, 629, 318/634, 611, 807; 361/143, 147–149, 140, 59; 335/220, 284

[56] References Cited

U.S. PATENT DOCUMENTS

| | | | |
|---|---|---|---|
| 2,963,643 | 12/1960 | Brown | 361/143 X |
| 3,683,239 | 8/1972 | Sturman | 361/143 X |
| 4,037,149 | 7/1977 | Foner | 324/34 R |
| 4,359,765 | 11/1982 | Mimura et al. | 361/147 |
| 4,577,143 | 3/1986 | Eschrich et al. | 318/701 |

FOREIGN PATENT DOCUMENTS

| | | |
|---|---|---|
| 0137324 | 4/1985 | European Pat. Off. |
| 1414722 | 1/1969 | Germany |
| 3137419 | 3/1983 | Germany |
| 2059111 | 4/1981 | United Kingdom |

OTHER PUBLICATIONS

"Zur adaptiven Regelung Elektro-hydraulischer Antriebe" Fortschritt-Berichte VDI, Series 8, No. 174, 1989, pp. 81–83.

"Ölhydraulic und Pneumatic", 25, 1981, No. 5, pp. 403–407.

*Primary Examiner*—Jonathan Wysocki
*Attorney, Agent, or Firm*—Herbert L. Lerner; Laurence A. Greenberg

[57] ABSTRACT

An actuator element of an electromagnetic transducer which converts an electric current into an associated mechanical variable, for example an oil pressure, a displacement or a force, has hysteresis which is reduced by the fact that a periodic fluctuation component (jitter current) is superimposed on an actuator current. The influence of the operating parameters of the actuator element (for example of the temperature) on the hysteresis is eliminated by the fact that the frequency or the amplitude of the fluctuation component is varied in dependence on the operating parameter.

8 Claims, 3 Drawing Sheets

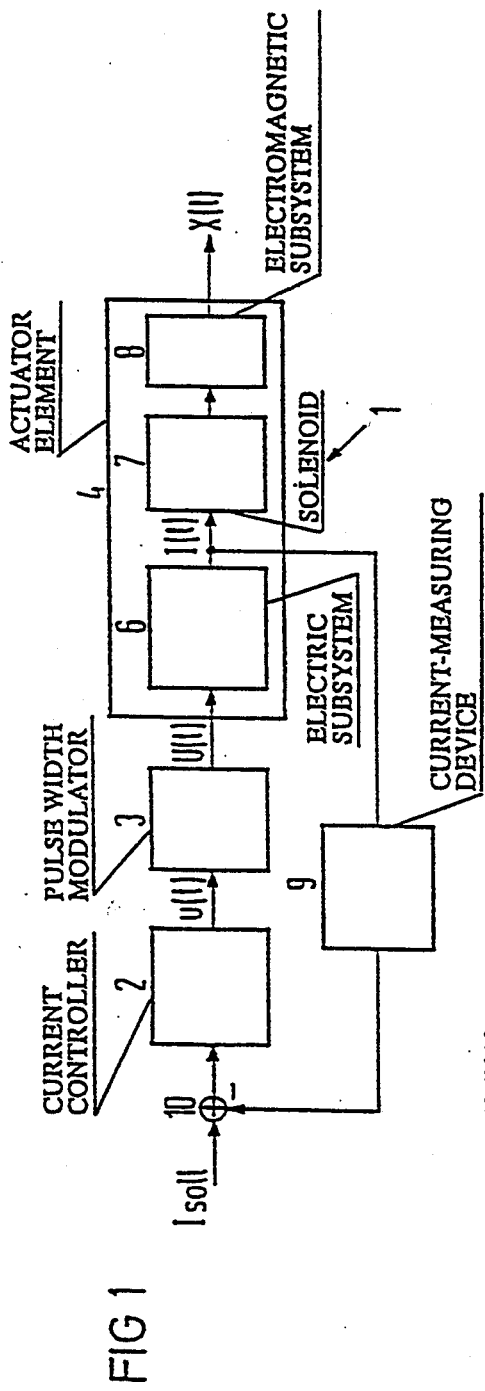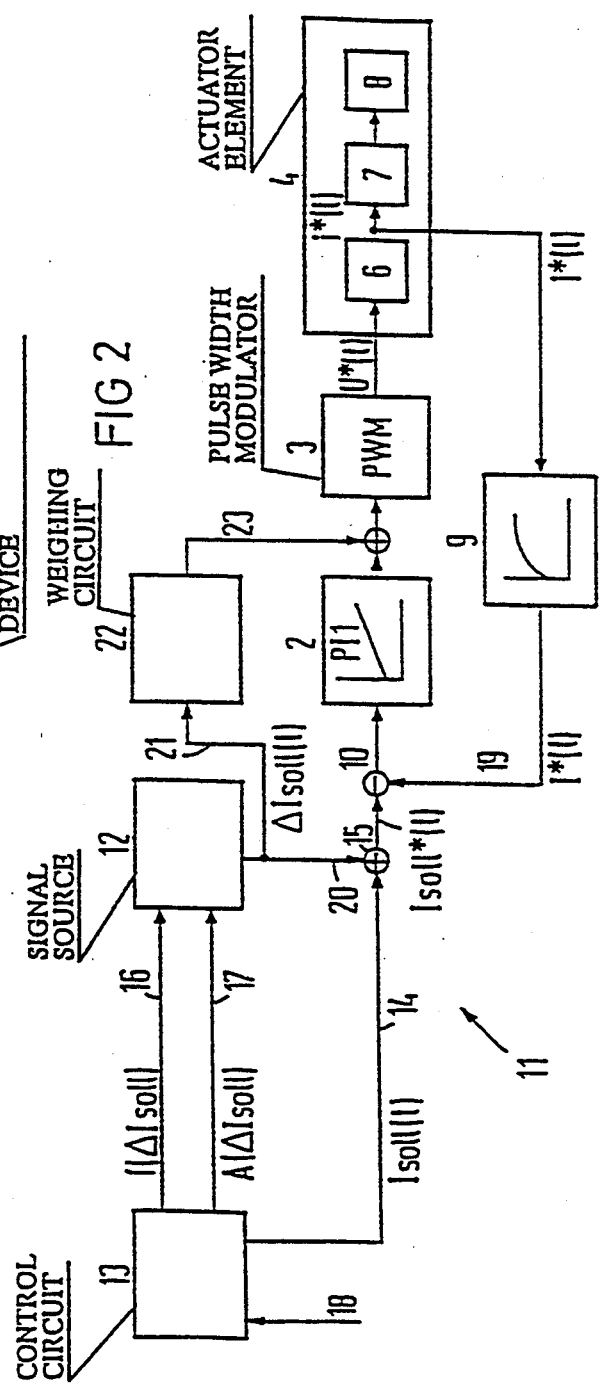

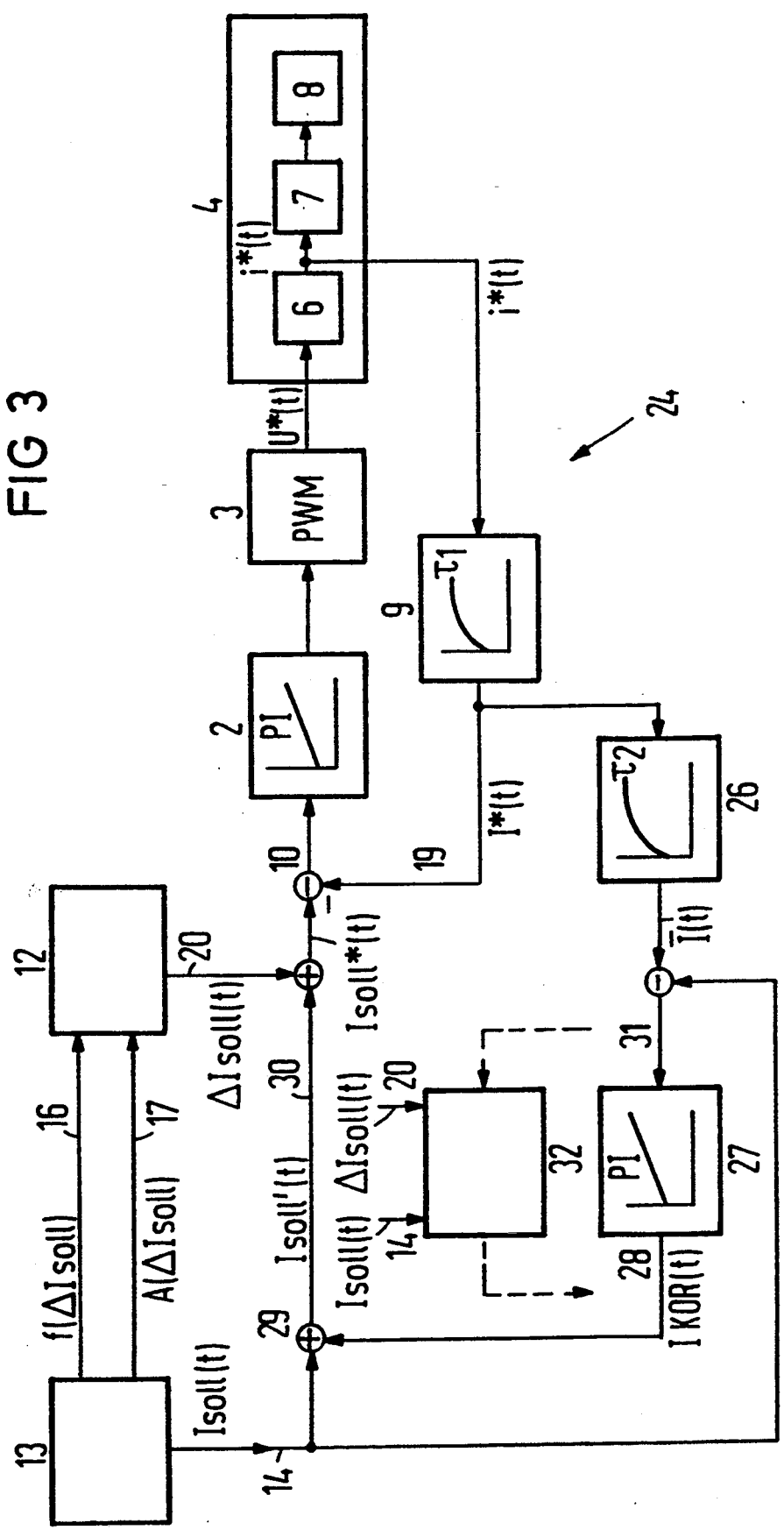

PROCESS FOR REDUCING HYSTERESIS EFFECTS, AND AN ELECTROMECHANICAL TRANSDUCER IN WHICH HYSTERESIS EFFECTS ARE REDUCED IN THIS WAY

Cross-Reference to Related Application:
This application is a Continuation of International Application Ser. No. PCT/EP91/01792, filed Sep. 19, 1991.

Specification:

The invention relates to a process for reducing hysteresis effects in an electromagnetic actuator element, in which a periodic fluctuation component having an amplitude which is varied in dependence on at least one operating parameter of the actuator element, is superimposed on an electric quantity that controls the actuator element. The invention also relates to an electromechanical transducer in which hysteresis effects are reduced and which includes an actuator element, a controller controlling the current of the actuator element, and a signal source superimposing a periodic fluctuation signal on the current.

The aim of such a transducer is the unambiguous conversion of an electric current as an input signal into an associated mechanical quantity which, for example, can be an oil pressure, a distance or a force. The transducer has hysteresis, that is to say in the case of a quasi-static movement, it is not possible to obtain an unambiguous correlation between the current and the mechanical quantity...In order to avoid the unwanted effects of hysteresis, it is known to determine hysteresis of the mechanical quantity or an associated current hysteresis by trial for a nominal operating temperature and to connect it to the nominal current in a direction-dependent manner as a constant correction signal, such as from the publication entitled: Fortschrttberichte VDI [Progress Reports VDI], Series 8, No. 174, 1989, pages 81 to 83. The disadvantageous factor in that process is that the temperature influence and the stray electromagnetic characteristics of the individual actuator elements cannot be taken into consideration.

It is also known to only adjust the operating points of the transducer to one of the two hysteresis lines in each case in such a way that, when the manipulated electrical variable changes in opposition to the direction of the hysteresis, an additional electrical signal is added in that direction for a fixed time and then is taken away again. The additional signal should be greater than the greatest hysteresis distance, according to Published European Application No. 0 137 324 A2, corresponding to U.S. Pat. No. 4,577,143.

In order to reduce hysteresis effects, it is also known to superimpose on the current a periodic signal which leads to a quasi-static dependence of the mechanical quantity on the current. The periodic signal must be of such a form that, on one hand, the desired reduction in hysteresis is achieved but that, on the other hand, the variation with time of the mechanical quantity is not disturbed too greatly by the periodic signal. Reference is made in that regard to the publication entitled: Ölhydraulik und Pneumatik [Fluid Hydraulics and Pneumatics]25 (1981) No. 5, pages 403 to 407. To that end, hysteresis is either reduced by means of a periodicity of the current variation which is achieved indirectly by a pulse width modulation in the current controller, or a fluctuation component with fixed frequency and fixed amplitude is superimposed on the coil current. The disadvantage of both approaches is that a dependence of hysteresis on the operating parameters of the actuator element, for example the temperature, is not taken into consideration. The consequence thereof is a risk that a mismatched superimposition signal is used which either produces too great a disturbance of the mechanical quantity or too little a reduction in hysteresis. In addition, the disadvantage of the indirectly achieved periodicity of the current is that the amplitude of the fluctuation component on the coil current depends on the pulse/no-pulse ratio of the pulse width modulation and thus lastly on the nominal current.

It is accordingly an object of the invention to provide a process for reducing hysteresis effects and an electromechanical transducer in which hysteresis effects are reduced in this way, which overcome the hereinaforementioned disadvantages of the heretofore-known methods and devices of this general type and which take into consideration the influence of the operating parameters of the actuator element in the hysteresis compensation.

With the foregoing and other objects in view there is provided, in accordance with the invention, a process for reducing hysteresis effects in an electromagnetic actuator element, which comprises varying the amplitude of a periodic fluctuation component in dependence on at least one operating parameter of an electromagnetic actuator element, superimposing the fluctuation component on an electric quantity controlling the actuator element, and controlling the amplitude or the frequency of the fluctuation component in dependence on current values of temperature or of a nominal current of the actuator element.

In accordance with another mode of the invention, there is provided a process which comprises adding the fluctuation component in variably weighted form to the nominal value of the current.

With the objects of the invention in view, there is also provided an electromechanical transducer with a device for reducing hysteresis effects, comprising an actuator element, a controller controlling an electric quantity of the actuator element, a signal source superimposing a periodic fluctuation signal on the quantity, and a control circuit varying the amplitude of the fluctuation signal, the control circuit generating control signals for the controller for controlling the frequency or the amplitude of the fluctuation component, in dependence on current values of temperature or of a nominal current of the actuator element.

In accordance with another feature of the invention, there are provided means for adding the fluctuation component in variably-weighted form to the nominal value of the current and to an output of the controller.

With the objects of the invention in view, there is additionally provided an electromechanical transducer in which hysteresis effects are reduced, comprising an actuator element, a controller controlling the current of the actuator element, a signal source superimposing a periodic fluctuation signal on the current, and a control circuit connected to the signal source, for varying the frequency or amplitude of the fluctuation component in dependence on at least one operating parameter of the actuator element.

In accordance with a further feature of the invention, there is provided a weighting circuit connected to an output of the signal source, for variably weighting and superimposing the fluctuation signal on an output signal of the controller.

In accordance with an added feature of the invention, there is provided an additional control loop for controlling and superimposing a mean current value on an output current.

In accordance with an additional feature of the invention, the additional control loop contains an adaptation circuit for determining a correction value from a system deviation and storing the correction value in a memory in dependence on the nominal value of the current and on the nominal amplitude of the fluctuation signal.

In accordance with yet another feature of the invention, there is provided a weighting circuit connected to an output of the signal source, for variably weighting and superimposing the fluctuation signal on an output signal of the controller.

In accordance with a concomitant feature of the invention, there is provided a further control loop for controlling a mean value of the amplitude of the fluctuation signal and supplying the mean value of the amplitude of the fluctuation signal to the signal source as a controlled variable.

Other features which are considered as characteristic for the invention are set forth in the appended claims.

Although the invention is illustrated and described herein as embodied in a process for reducing hysteresis effects and an electromechanical transducer in which hysteresis effects are reduced in this way, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a schematic and block circuit diagram showing a basic structure of an electromagnetic transducer with current control;

FIG. 2 is a diagram showing a controlled electromagnetic transducer according to the invention;

FIG. 3 is a diagram showing a second electromagnetic transducer according to the invention.

Figure 4:
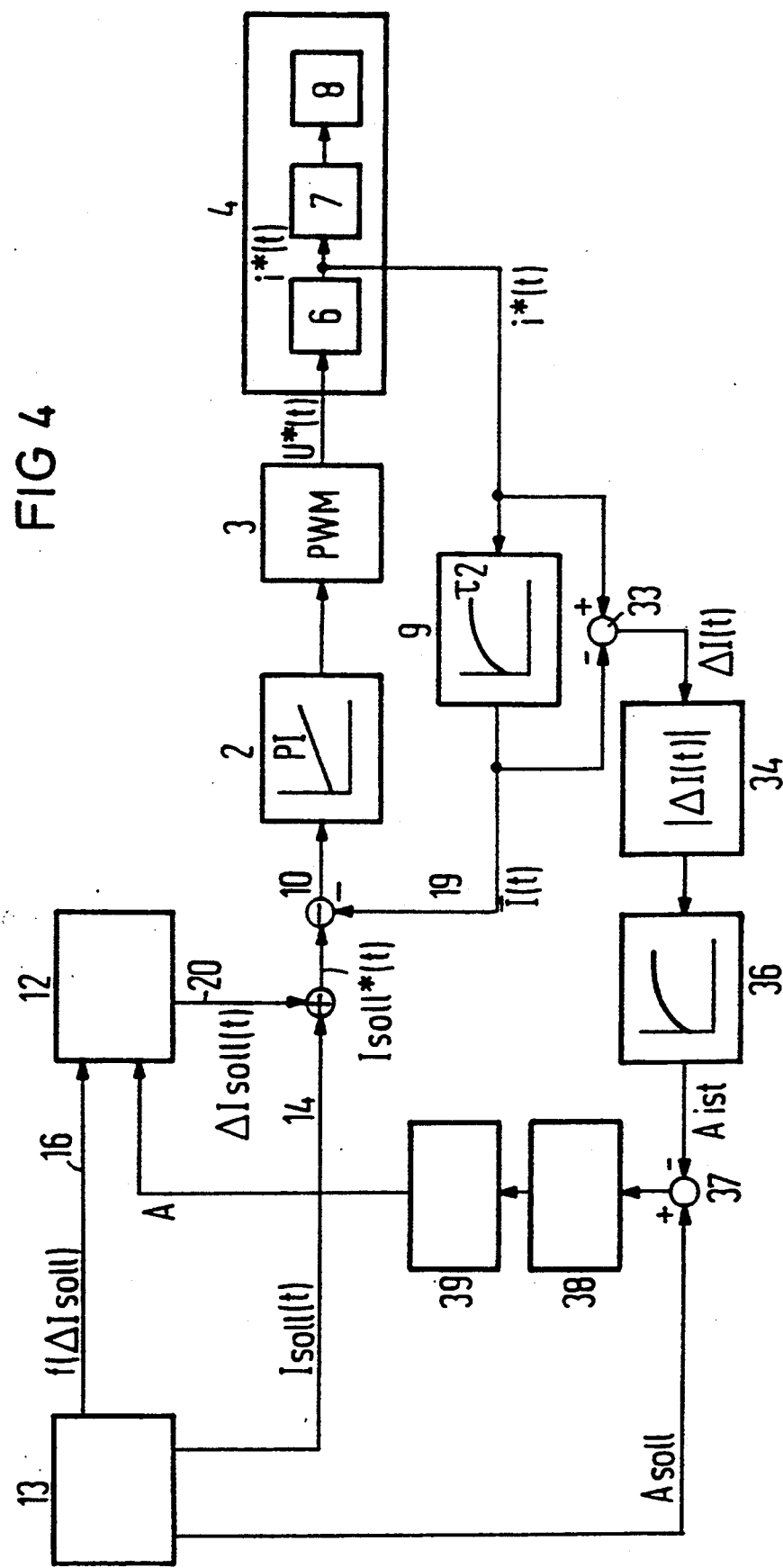
FIG. 4 is a diagram showing a third electromagnetic transducer according to the invention.

Referring now to the figures of the drawing in detail and first, particularly, to FIG. 1 thereof, there is seen an electromagnetic transducer 1 which forms a control loop and receives a reference variable or input signal which is a nominal current Isoll that is supplied to a current controller 2. The current controller supplies a voltage u(t) to a pulse width modulator 3 which, in turn, applies a pulse-modulated voltage signal U(t) to the input of an actuator element 4.

The actuator element 4 includes an electric subsystem 6, a current/force transducer in the form of a solenoid 7 and possibly an electromagnetic subsystem 8 which converts the force into a desired mechanical output variable X(t).

The mechanical variable X(t) is not measured directly, but instead a current I(t) occurring in the electric subsystem 6 is measured in a current-measuring device 9 and is appropriately controlled. To this end, the actual current value passes as a controlled variable to a subtraction element 10 where it is compared with the nominal current Isoll. The system deviation is used for control in the current controller 2 and is connected to the electric subsystem 6 through the pulse width modulator 3.

Apart from the components that are explained with reference to FIG. 1 and are provided with the same reference symbols, an electromagnetic transducer 11 seen in FIG. 2 additionally has the following circuit components: a signal source 12 which generates a periodic signal and a control circuit 13 which controls the signal source 12. The control circuit 13 supplies the nominal current Isoll(t) to an adding element 15 over a line 14 and it supplies the frequency f and the amplitude A of the periodic signal to the signal source 12 over respective lines 16 and 17. A line 18 supplies the control circuit 13 with the current or present values of an operating parameter of the actuator element 4, for example its temperature, by means of which it freely predeterminably defines the frequency f and the amplitude A of the periodic signal.

The current-measuring device 9 is constructed as a first-order delay element in order to suppress a fluctuation component $\Delta(t)$ in i*(t) (time constant 11) caused by the pulse width modulator.

The periodic signal generated in the signal source 12 is supplied through a line 20 to the adding element 15 where it is superimposed on the nominal current as a fluctuation component $\Delta$Isoll(t). The fluctuation component can have an arbitrary periodic variation with time, for example sinusoidal or rectangular.

The fluctuation component is added to the nominal current value and results in a changed nominal value $$I_*soll(t) = Isoll(t) + \Delta ISOll(t),$$

which is used as a new nominal value for the current control. In this manner, the actual current I,(t) in the electrical subsystem 6 of the actuator element 4 exhibits a fluctuation component $\Delta I(t)$ which is adjustable in frequency and in amplitude (neglecting $\Delta i(t)$):

$$I^*(t) = \bar{I}(t) + \Delta I(t),$$

where $\bar{I}(t)$ represents an averaged actual current.

In the adding element 15, the system deviation from the nominal current on the line 14 with the superimposed fluctuation component on the line 20 and the changed nominal current on a line 19, is formed.

It is essential that the control circuit 13 selects the frequency f and amplitude A parameters of the fluctuation component $\Delta I(t)$ as a function of at least one operating parameter of the actuator element 4 in such a manner that for all operating ranges of the actuator element, a fluctuation component of the current is used which is optimized in such a manner that, on one hand, the mechanical variable X has the least possible hysteresis and, on the other hand, the disturbance acting on the mechanical variable X is as low as possible. Apart from the temperature of the actuator element 4, the nominal current Isoll(t) can also be used as an input or an independent parameter for the control circuit 13.

By introducing the fluctuation component $\Delta$Isoll(t) into the nominal value of the current control loop, control processes are continuously produced which can lead to an inaccuracy with respect to the mean current value I(t) occurring and the mean nominal current Isoll(t). This possible quasi-static inaccuracy is reduced by an additionally weighted connection of the fluctuation component ΔIsoll(t) to the output signal of the current controller 2. The fluctuation component ΔIsoll(t) is applied over a line 21 to a weighting circuit 22 where it is weighted with a factor. The weighting is such that the component added to the output of the current controller 2 over a line 23 supplies the greatest proportion of the actuator element current while the current controller 22 supplies the lesser component and only carries out fine control, as it were.

The weighted addition is variable: it can be made dependent on the nominal current or a higher nominal current leading to a higher weighting factor, and it can also depend on the temperature, with the weighting factor being selected to be small at higher temperature and large at lower temperature.

This takes into consideration the greater viscosity of the hydraulic oil, and thus greater hysteresis at low temperature, in the case where the mechanical variable to be controlled is a hydraulic pressure. For example, the frequency of the fluctuation signal impressed on the coil current can be 50 Hz and is low as compared with the sampling rate of the pulse width modulator 3 which can be about 1 kHz.

In another electromagnetic transducer 24 shown in FIG. 3, the output of the current-measuring device 9 is also connected to a first-order delay element 26, that is also known as a PT element, in which a time constant is T2>>T1. The time constant T2 is dimensioned in such a way that it is not the variance ΔI(t) of the current I*(t) which appears on the signal at the output of the delay section but the averaged value I(t). Together with the nominal current Isoll(t), this value forms a system deviation which is supplied to another controller 27 that is constructed as PI controller. The controller 27 generates a correction current Ikor(t) which passes over a line 28 to an adding element 29 where it is added to the nominal current and results in a changed nominal current Isoll'(t) that is input over a line 30 as a nominal value to the first control loop that was already described.

Instead of the PI controller 27, an adaptation circuit 32, which is indicated by dashed lines in the drawing, can also be used, in order to use the system deviation present on a line 31 to form a correction value which is stored in the form of a family of correction values in a memory in dependence on the nominal current value Isoll(t) on the line 14, and in dependence on the amplitude of the fluctuation component ΔIsoll(t), on the line 20. Thus, an adapted correction current Ikor(t) is always available even when the signal on the line 31 has not yet settled. The signal on the line 14 is evaluated for this purpose.

In the case of the electromagnetic transducer 24 as well, the fluctuation component can also be added to a nominal current value by means of the weighting circuit 22 described with reference to FIG. 2, even though this is not shown in the drawing. This, too, then results in a higher adjustment accuracy of the current I(t).

The measures described above provide for accurate adjustment of the averaged actual current I(t) with respect to the required mean nominal current Isoll(t). Deviations between the changed nominal current I*soll(t) and the actual current I*(t) due to the continuous controlling processes also lead to deviations in the actual fluctuation component ΔI(t) with respect to the nominal fluctuation component FIsoll(t). Depending on the respective application of the transducer, these deviations in the fluctuation components can be tolerated or must be compensated for.

According to FIG. 4, if compensation is necessary, it can be carried out by the fluctuation component also being controlled by a higher-level controller in a manner analogous to the superimposed mean value control. The amplitude of the fluctuation component ΔI(t) is then controlled as follows: in a subtracting element 33, a difference is formed between the input and the output signal of the current-measuring device 9 (PT$_1$ element with time constant $\tau 2$) and the amount of the difference signal ΔI(t) is formed in a rectifier 34 and then smoothed in a filter circuit 36. The result is an actual amplitude A of the fluctuation component ΔI(t). The difference between the nominal amplitude Asoll of the current supplied by the control circuit 13 and the actual amplitude Aist, is formed by an element 37 and supplied to a controller 38. The controller output signal is limited and integrated in a limiting integrator 39 which limits it between 0 and a maximum value Amax, and thus a signal A is generated which is supplied to the signal source 12 as a fluctuation amplitude to be adjusted.

We claim:

1. A process for reducing hysteresis effects in an electromagnetic actuator element, which comprises:

varying the amplitude of a periodic fluctuation component in dependence on at least one operating parameter of an electromagnetic actuator element, superimposing the fluctuation component on an electric quantity controlling the actuator element by adding the fluctuation component in variably weighted form to the nominal value of the current, and controlling the amplitude or the frequency of the fluctuation component in dependence on current values of temperature or of a nominal current of the actuator element.

2. An electromechanical transducer with a device for reducing hysteresis effects, comprising:

an actuator element, a controller controlling an electric quantity of said actuator element, a signal source superimposing a periodic fluctuation signal on the quantity, a control circuit varying the amplitude of the fluctuation signal, said control circuit generating control signals for said controller for controlling the frequency or the amplitude of the fluctuation component, in dependence on current values of temperature or of a nominal current of said actuator element, and means for adding the fluctuation component in variably-weighted form to the nominal value of the current and to an output of said controller.

3. An electromechanical transducer in which hysteresis effects are reduced, comprising:

an actuator element, a controller controlling the current of the actuator element, a signal source superimposing a periodic fluctuation signal on the current, a control circuit connected to said signal source, for varying the frequency or amplitude of the fluctuation component in dependence on at least one operating parameter of said actuator element, and a weighting circuit connected to an output of said signal source, for variably weighting and superimposing the fluctuation signal on an output signal of said controller.

4. The transducer according to claim 3, wherein said additional control loop contains an adaptation circuit for determining a correction value from a system deviation and storing the correction value in a memory in dependence on the nominal value of the current and on the nominal amplitude of the fluctuation signal.

5. The transducer according to claim 3, including a weighting circuit connected to an output of said signal source, for variably weighting and superimposing the fluctuation signal on an output signal of said controller.

6. An electromechanical transducer in which hysteresis effects are reduced, comprising:
   an actuator element,
   a controller controlling the current of the actuator element, a signal source superimposing a periodic fluctuation signal on the current, a control circuit connected to said signal source, for varying the frequency or amplitude of the fluctuation component in dependence on at least one operating parameter of said actuator element, and
   a further control loop for controlling a mean value of the amplitude of the fluctuation signal and supplying the mean value of the amplitude of the fluctuation signal to said signal source as a controlled variable.

7. An electromechanical transducer in which hysteresis effects are reduced, comprising:
   an actuator element,
   a controller controlling the current of the actuator element,
   a signal source superimposing a periodic fluctuation signal on the current,
   a control circuit connected to said signal source, for varying the frequency or amplitude of the fluctuation component in dependence on at least one operating parameter of said actuator element, and
   an additional control loop for controlling and superimposing a mean current value on an output current.

8. The transducer according to claim 4, including a weighting circuit connected to an output of said signal source, for variably weighting and superimposing the fluctuation signal on an output signal of said controller.

* * * * *